INVENTORS.
CHARLES A. BUTLER
DUSTIN W. CARTER
BY
Sidney Magnes
AGENT

United States Patent Office 3,463,420
Patented Aug. 26, 1969

3,463,420
INFLATABLE WING
Charles A. Butler, San Pedro, and Dustin W. Carter, Anaheim, Calif., assignors to North American Rockwell Corporation
Filed Feb. 28, 1968, Ser. No. 709,001
Int. Cl. B64c 3/46
U.S. Cl. 244—46                                   12 Claims

ABSTRACT OF THE DISCLOSURE

Apparatus for providing an aircraft with a variable-area wing; the wing having a rigid leading edge, a rigid trailing edge that carries control surfaces, and an inflatable intermediate area—so that the wing may be deflated and retracted for high-speed flight, and may be inflated and deployed for low-speed travel.

INTRODUCTION

It is well known that present day airplanes require one "planform" for high-speed, and another "planform" for low-speed take-off and landings—the "plantform" merely being a top view of the aircraft. For high-speed flight, the wings should be relatively small, and are generally swept backward, giving the airplane an arrow-like planform; whereas for low-speed flight, the wings should have a rather large area, thus providing high lift for these conditions. Prior-art solutions have included swing wings; deployable rigid panels to increase the wing area for desired flight conditions; and paraglider-type wings that are deployed when desired. All of these, unfortunately, have been generally unsatisfactory, requiring design compromises, often at the expense of low-speed flight characteristics, or inability to meet load or temperature requirements of supersonic flight conditions.

OBJECTS AND DRAWINGS

It is therefore an object of the present invention to provide an improved variable-planform airplane for use at high and low speeds.

Figure 1:
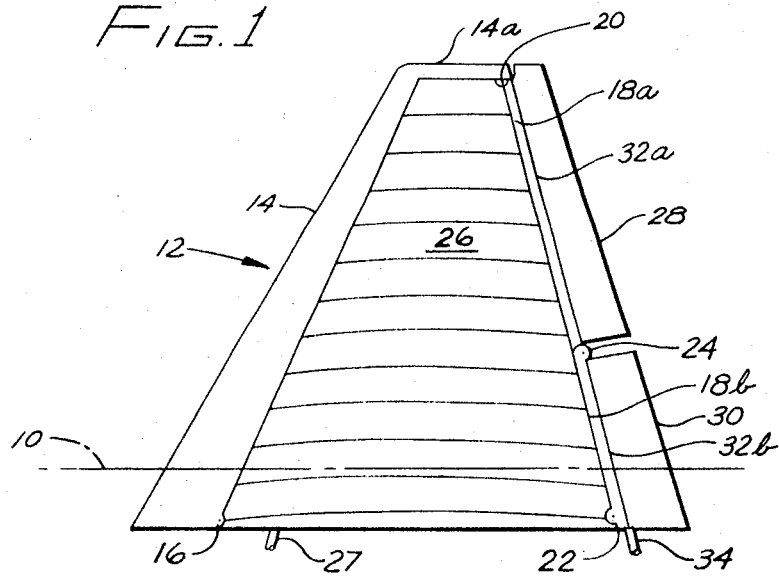
Figure 2:
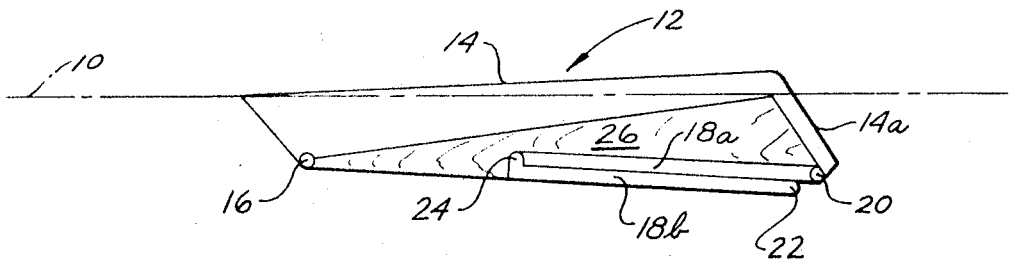
Figure 3A:
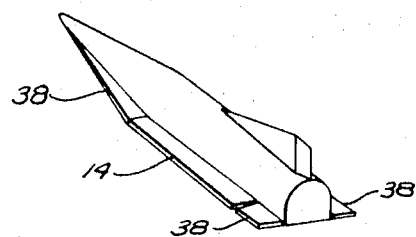
Figure 3B:
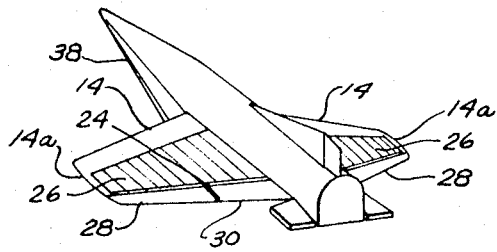
Figure 4A:
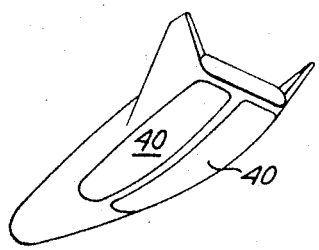
Figure 4B:
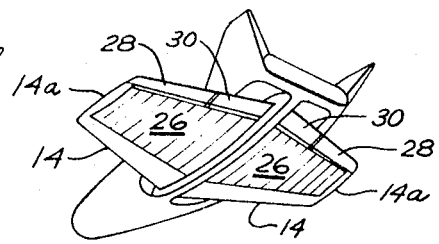
Figure 5A:
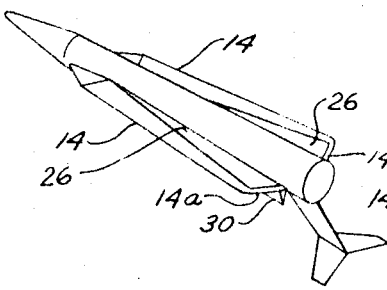
Figure 5B:
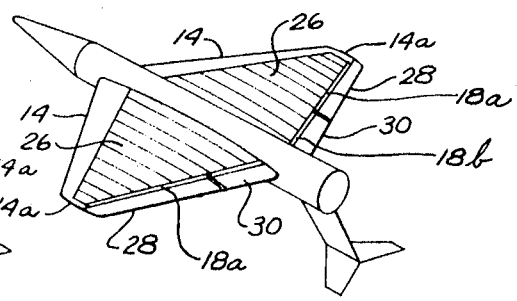

The attainment of this object and others will be realized from the teachings of the following detailed description, taken in conjunction with the drawings of which:

FIGURE 1 shows the wing in a deployed position;
FIGURE 2 shows the wing in a stowed position;
FIGURES 3a and 3b show the wing used in a high left/drag vehicle;
FIGURES 4a and 4b show the wing used in a lifting body vehicle; and
FIGURES 5a and 5b show the wing used in a ballistically launched vehicle.

SYNOPSIS

In general, the apparatus described herein, according to the present invention comprises an aircraft wing of the deployable "rigidized inflatable" type. The wing has a rigid leading edge, a rigid trailing edge to which control surfaces are attached, and an inflatable intermediate area. When the intermediate wing portion is inflated, the wing assumes a low-speed configuration; with the rigid leading edge, the contoured intermediate portion, and the rigid trailing edge and associated control surfaces coacting in their normal manner. When however, the intermediate wing portion is deflated, the wing structure may be collapsed, and retracted into the fuselage to produce a high-speed planform for the aircraft.

DESCRIPTION

The inventive concept will be understood from FIGURES 1 and 2. FIGURE 1 shows the wing assembly in its deployed configuration; and an airplane fuselage, indicated at 10, has a wing 12 attached thereto—wing 12 comprising a rigid leading edge 14 that may be a structural torque-box structure that is attached to the fuselage 10 by means such as pivot 16. The leading edge 14 has an angulated integral portion 14a that extends rearwardly in extended wing position, and acts to protect and provide space for the flexible wing portion in the high-speed retracted position. Wing 12 also has a composite foldable rigid trailing edge 18 comprising an outboard portion 18a and an inboard-portion 18b; outboard-portion 18a of the rigid trailing edge being pivoted to the leading edge, portion 14a, by pivot 20, and inboard portion 18b of the rigid trailing edge being pivoted to fuselage 10 by means of pivot 22—an intermediate pivot 24 permitting the composite trailing edge 18 to be folded.

The intermediate portion 26 of the wing is inflatable, having its leading side affixed to said leading edge, its trailing side affixed to said trailing edge, and its inboard side affixed to said body; its inflatable portion 26 being formed of any suitable material such as rubber, plastc, metal cloth, or the air mat material described in U.S. Patent 2,743,510. Compressed gas may (by means such as tubing 27) be introduced into, and exhausted from, intermediate wing section 26 by any well-known apparatus. In any case, inflatable-portion 26 is of a suitable cross sectional configuration to "fair" into leading edge 14 and trailing edge 18, and is contoured to provide the desired lifting characteristics when the wing is inflated and deployed as shown in FIGURE 1.

Control surfaces 28 and 30 are pivotally attached to the inboard and outboard portions 18a and 18b of the trailing edge by any suitable means such as continuous hinges 32a and 32b; and are linked with the aircraft controls—as by cables or hydraulic piping 34—to permit these control surfaces to guide the airplane into the desired attitude. Alternatively control surfaces 28 and 30 may be fixed, to provide stability.

Thus, for low-speed flight, the wing takes the overall extended configuration shown in FIGURE 1.

FIGURE 2 shows the wing in a stowed high-speed configuration. As indicated, the intermediate inflatable portion 26 has been deflated; and the wing is folded into its compact position. To do this, the trailing edges 18a and 18b are folded upon themselves at hinge 24 to form a compact package; and control surfaces 28 and 30 are folded either upwards, downwards, or in opposite directions to fit into a recessed portion of the fuselage. In this way, the inflated wing 12 is stowed in a recessed location, leaving only a small desired area of the rigid leading edge 14 exposed beyond fuselage 10 to provide desired stability.

In order to deploy the wing from its stowed position, the wing is inflated, the inflation pressure forcing the intermediate portion 26 to assume its design shape, forcing the leading edge 14 forward, and unfolding the rear trailing edge 18. When the wing is deployed, the various elements are locked in their fully extended position. If deemed necessary or desirable, a mechanical, pneumatic, hydraulic, or electric actuator may be employed to operate the rigid leading or trailing edge portions, or both, and to lock these in position.

The basic apparatus, described herein, can be applied to a number of types and sizes of vehicles as demonstrated by the three representative application concepts shown in FIGURES 3, 4, and 5. The size and shape of the expandable wing surface can be varied accordingly without changing the basic design concept.

FIGURE 3 illustrates the inflatable wing utilized on a high Lift/Drag cruise vehicle wherein the wing is stowed in a low-aspect ratio body fairing for hypersonic flight as shown in FIGURE 3a; leading edge 14 forming part of a longitudinal guiding fin 38. The wing assembly is extended as shown in FIGURE 3b to provide the desired configuration for subsonic flight and landing operations.

Application of the subject invention to a Lifting-Body type reentry vehicle to provide improved post-reentry flight and landing capability is illustrated in FIGURE 4. In this application the extendable wing apparatus is stowed in the basic body behind a jettisonable panel 40, for heat protection and streamlining the boost, orbital, and reentry phase of the mission as shown in FIGURE 4a. After reentry, the outer panel 40 is jettisoned, the wing is deployed through the resulting opening; the wing being inflated to a configuration, such as shown in FIGURE 4b, to provide the desired aerodynamic characteristics and control capability for subsonic flight and landing operations.

Another application of the inflatable wing is illustrated in FIGURE 5 wherein the deployed wing is applied to a ballistically launched vehicle to provide a cruise capability or controlled recovery. During launch and ballistic flight phase of the mission, the wing apparatus is folded into a small compartment along the side of the vehicle as shown in FIGURE 5a. Since the vehicle of FIGURE 5a is relatively small, it cannot enclose the wing assembly, which is therefore compacted outside the vehicle. In this case, one control surface 28 is illustrated as being folded upwards, whereas the other control surface 30 is illustrated as being folded downward. At a desired point during the operational mission, the wing is extended to provide the desired configuration, illustrated in FIGURE 5b, for the terminal phase of the mission—the wing assembly deploying as discussed above.

As may be seen, in these various embodiments the wings are inflated and deployed for the low-speed operation, and are stowed for the high-speed operation; a portion of the wing being exposed or retracted to obtain the desired flight characteristics. It will be noted that during reentry or high-speed flight, the suitably designed rigid wing portions take the brunt of pressure and/or heat; and that deployment or retraction occurs at such speeds that the wing is not exposed to undue pressure or temperature.

What is claimed is:
1. A variable-geometry vehicle comprising:
   (I) a body;
   (II) a pair of wing assemblies, mounted to the body, for movement between a high-speed wing position in which the wings are retracted, and a low-speed wing position in which the two wings are extended from the body in opposite directions, each wing assembly comprising
   (a) a rigid leading edge, pivoted to the body, and having inboard and outboard portions, said leading edge extending outwardly in said low-speed wing position, and extending rearwardly in said high-speed wing position;
   (b) a composite trailing edge having a rigid inboard portion and a rigid outboard portion pivoted together at proximal ends, said inboard trailing edge portion being pivoted at the other end thereof to the body, said outboard trailing edge portion being pivoted at the other end thereof to the leading edge outboard portion; and
   (c) a flexible wing portion secured to the body along its inboard side, secured to the leading edge along its leading side, and secured to the inboard and outboard trailing edges along its trailing side—whereby in said low-speed position the rigid edges provide dimensional stability for the entire periphery of the flexible member, and in said high-speed position the flexible member and both trailing edge portions are retracted.

2. The combination of claim 1 wherein said outboard portion of said leading edge extends rearwardly of said inboard portion of said leading edge, and when said wings are in their retracted high-speed wing position, said outboard leading edge portion provides a space into which said flexible wing portion is retracted.

3. The combination of claim 2 wherein the body has a recess on each side thereof, each recess having a forward portion and a rearward portion, said leading edge being pivoted to the body within the forward portion of the recess and said inboard portion of the said trailing edge being pivoted to the body within the rearward portion of the recess, whereby the wing assembly is largely contained within the recess in low-speed position.

4. A wing for an aircraft, comprising:
   a rigid leading edge;
   a rigid trailing edge;
   an inflatable-deflatable intermediate wing portion affixed between said rigid leading and trailing edges—whereby said rigid leading and trailing edges are adapted to withstand leading and trailing edge strains, and said inflatable-deflatable intermediate wing portion completes the desired wing configuration; and
   pivot means, attached to one of said edges, for dividing said edge into an inboard and an outboard portion, and adapting said edge to fold.

5. The combination of claim 4 including means for pivotally attaching said outboard end of said outboard portion of said divided edge to the outboard end of said undivided edge, for permitting said divided edge to fold upon itself, and permitting said undivided edge to pivot to a position adjacent said folded edge, with said deflated intermediate wing portion positioned between said edges.

6. The combination of claim 4 including
   pivot means, affixed to said rigid trailing-edge, for dividing said trailing edge into a rigid inboard portion and a rigid outboard portion, and adapting said inboard and outboard portions to fold upon each other;
   means for pivotally attaching the inboard end of said leading edge to the fuselage of said aircraft;
   means for pivotally attaching the outboard end of said leading-edge to the outboard end of said outboard portion of said trailing edge; and
   means for pivotally attaching the inboard end of said inboard portion of said trailing edge to said fuselage—whereby said intermediate wing portion may inflated to deploy said wing and rigid leading and trailing edges, and may be deflated to permit retracting said wing and leading and trailing edges into a compact configuration.

7. The combination of claim 4 including at least one angularly variable control surface hingedly affixed to said trailing edge.

8. A wing for an aircraft, comprising:
   a rigid leading edge;
   a rigid trailing edge;
   an inflatable-deflatable intermediate wing portion affixed between said rigid leading and trailing edges—whereby said rigid leading and trailing edges are adapted to withstand leading and trailing edge strains, and said inflatable-deflectable intermediate wing portion completes the desired wing configuration;
   pivot means, affixed to said rigid trailing edge, for dividing said trailing edge into a rigid inboard portion and a rigid outboard portion, and adapting said inboard and outboard portions to fold upon each other;
   means for pivotally attaching the outboard end of said leading edge to the outboard end of said outboard portion of said trailing edge;
   means for pivotally attaching the inboard end of said inboard portion of said trailing edge to said fuselage—whereby said intermediate wing portion may be inflated to deploy said wing and rigid leading and trailing edges, and may be deflated to permit retracting said wing and leading and trailing edges into a compact configuration; and a first control surface hingedly attached to said outboard portion of said trailing edge, and a second control surface hingedly attached to said inboard portion of said trailing edge.

9. A wing for an aircraft, comprising:
   a rigid leading edge;
   a rigid trailing edge;
   an inflatable-deflatable intermediate wing portion affixed between said rigid leading and trailing edges;
   pivot means, affixed to said rigid trailing edge, for dividing said trailing edge into a rigid inboard portion and a rigid outboard portion, and adapting said inboard and outboard portions to fold upon each other;
   means for pivotally attaching the inboard end of said leading edge to the fuselage of said aircraft;
   means for pivotally attaching the outboard end of said leading edge to the outboard end of said outboard portion of said trailing edge;
   means for pivotally attaching the inboard end of said inboard portion of said trailing edge to said fuselage;
   a first control surface hingedly affixed to the outboard portion of said trailing edge;
   a second control surface hingedly affixed to the inboard-portion of said trailing edge;
   means for inflating and deflating said intermediate portion of said wing; and
   means for actuating said control surfaces.

10. A variable-geometry vehicle of the type shown in FIGURES 3a and 3b, comprising:
   (I) a high lift/drag body having a longitudinal guiding fin on each side of said body;
   (II) a pair of wing assemblies, mounted to the body, for movement between a high-speed wing position in which the two wing assemblies are retracted partially into the body, and a low-speed wing position in which the two wing assemblies are extended from the body in opposite directions, each wing assembly comprising
      (a) a rigid leading edge, pivoted to the body, said leading edge extending outwardly in said low-speed wing position and forming a rearward extension of said longitudinal fin in said high-speed wing position;
      (b) a composite trailing edge having a rigid inboard portion and a rigid outboard portion pivoted together at proximal ends, said inboard trailing edge portion being pivoted at the other end thereof to said body, and said outboard trailing edge being pivoted at the other end thereof to said leading edge;
      (c) a flexible wing-portion secured to the leading edge along its leading side, and secured to the inboard and outboard trailing edges along its trailing side, and secured to the body along its inboard side, said rigid edges providing dimensional stability for the entire periphery of the flexible member in the low-speed position, both said trailing edges being retracted and said rigid leading edge being part of said longitudinal guiding fin in said high-speed position.

11. A variable-geometry lifting-body vehicle of the type shown in FIGURES 4a and 4b, comprising:
   (I) a body having a pair of recesses in the lower portion thereof;
   (II) a pair of wing assemblies, mounted to the body, for movement between a high-speed wing position in which the two wing assemblies are retracted into the body, and a low-speed wing position in which the two wing assemblies are extended from the body in opposite directions, each wing assembly comprising
      (a) a rigid leading edge, pivoted to the body, said leading edge extending outwoardly in said low-speed wing position;
      (b) a composite trailing edge having a rigid inboard portion and a rigid outboard portion pivoted together at proximal ends, said inboard trailing edge portion being pivoted at the other end thereof to the body, said outboard trailing edge portion being pivoted at the other end thereof to said leading edge;
      (c) a flexible wing portion secured to the leading edge along its leading side, secured to the inboard and outboard trailing edges along its trailing side, and secured to the body along its inboard side, said rigid edges providing dimensional stability for the entire periphery of the flexible member in the low-speed position, and said entire wing assembly being adapted to be retracted into said recesses in said high-speed wing position; and
      (d) means, comprising a pair of jettisonable panels adapted to cover the opening of said recesses, for enclosing the retracted wing assembly and streamlining said body.

12. A variable-geometry vehicle of the type shown in FIGURES 5a and 5b, comprising:
   (I) a body;
   (II) a pair of wing assemblies, mounted to the body, for movement between a high-speed wing position in which the two wings are retracted toward the body, and a low-speed wing position in which the two wings are extended from the body in opposite directions, each wing assembly comprising
      (a) a rigid leading edge, pivoted to the body, said leading edge extending outwardly in said low-speed wing position, and extending rearwardly as a longitudinal guidance fin in said high-speed wing position;
      (b) a composite trailing edge having a rigid inboard portion and a rigid outboard portion pivoted together at proximal ends, said inboard trailing edge portion being pivoted at the other end thereof to said body and said outboard trailing edge portion being pivoted to said leading edge; and
      (c) a flexible wing portion secured to the leading edge along its leading side, secured to the inboard and outboard trailing edges along its trailing side, and secured to the body at its inboard side, said rigid edges providing dimensional stability for the entire periphery of the flexible member in the low-speed position, one of said trailing edge portions being folded upwardly substantially against the external surface of said body, and the other of said trailing edge portions being folded downwardly substantially against the external surface of said body, said trailing edges being retracted, and both said rigid leading edges being part of said longitudinal fins in said high-speed position.

References Cited

UNITED STATES PATENTS

| | | | |
|---|---|---|---|
| 2,616,509 | 11/1952 | Thomas | 244—43 X |
| 2,886,265 | 5/1959 | Ritter et al. | 244—123 X |
| 3,092,355 | 6/1963 | Brown | 244—43 |
| 3,118,639 | 1/1964 | Kiceniuk | 244—123 X |
| 3,184,187 | 5/1965 | Isaac | 244—43 |

MILTON BUCHLER, Primary Examiner

JEFFREY L. FORMAN, Assistant Examiner

U.S. Cl. X.R.

244—43, 49, 123